US012091764B2

(12) United States Patent
Bell et al.

(10) Patent No.: US 12,091,764 B2
(45) Date of Patent: Sep. 17, 2024

(54) INTERNAL STEAM DELIVERY SYSTEM

(71) Applicant: Bloom Energy Corporation, San Jose, CA (US)

(72) Inventors: Shannon Bell, San Jose, CA (US); Andy Ta, San Jose, CA (US); Cory Mcclintic, San Jose, CA (US); Anthony Brewer, San Jose, CA (US); Julio Luna, San Jose, CA (US); Mark Stanton, San Jose, CA (US); Alireza Saeedmanesh, San Jose, CA (US); Ehsan Raoufat, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/160,440

(22) Filed: Jan. 27, 2023

(65) Prior Publication Data
US 2023/0235466 A1 Jul. 27, 2023

Related U.S. Application Data

(60) Provisional application No. 63/303,907, filed on Jan. 27, 2022.

(51) Int. Cl.
C25B 9/67 (2021.01)
C25B 1/04 (2021.01)
(Continued)

(52) U.S. Cl.
CPC ............ C25B 9/67 (2021.01); C25B 1/04 (2013.01); C25B 9/70 (2021.01); C25B 15/021 (2021.01); C25B 15/08 (2013.01)

(58) Field of Classification Search
CPC ...... C25B 9/67; C25B 9/60; C25B 9/70–9/77; C25B 15/02–15/023;
(Continued)

(56) References Cited

U.S. PATENT DOCUMENTS

2005/0183948 A1* 8/2005 Rusta-Sallehy ... H01M 8/04589
204/228.6
2005/0186458 A1 8/2005 Rusta-Sallehy et al.
(Continued)

FOREIGN PATENT DOCUMENTS

CN 113278992 B 9/2021
CN 113621977 A 11/2021
(Continued)

OTHER PUBLICATIONS

Thiele ("Electric heaters compared to heat exchangers: competitors or suppmements", Heat Exchanger World, 2020) (Year: 2020).*
(Continued)

Primary Examiner — Alexander W Keeling
(74) Attorney, Agent, or Firm — THE MARBURY LAW GROUP PLLC

(57) ABSTRACT

A solid oxide electrolyzer cell (SOEC) system including a stack of electrolyzer cells configured to receive liquid water that is heated using one or more heaters, and a mass flow controller configured to control the liquid water flowrate into the one or more heaters.

9 Claims, 5 Drawing Sheets

(51) Int. Cl.
*C25B 9/70* (2021.01)
*C25B 15/021* (2021.01)
*C25B 15/08* (2006.01)

(58) Field of Classification Search
CPC ...... C25B 15/08–15/087; H01M 8/24–8/2495; H01M 50/70–50/77; H01M 8/04–8/04298
See application file for complete search history.

(56) References Cited

U.S. PATENT DOCUMENTS

| | | | |
|---|---|---|---|
| 2011/0076573 A1* | 3/2011 | Akikusa | H01M 8/04753 429/429 |
| 2016/0040311 A1* | 2/2016 | Jakobsson | C25B 1/00 205/347 |
| 2016/0369416 A1 | 12/2016 | Mermelstein et al. | |
| 2016/0377342 A1 | 12/2016 | Mermelstein | |
| 2017/0175277 A1 | 6/2017 | von Olshausen et al. | |
| 2018/0069253 A1 | 3/2018 | Chatroux et al. | |
| 2018/0131018 A1 | 5/2018 | Perry et al. | |
| 2018/0287179 A1 | 10/2018 | Rueger et al. | |
| 2020/0328436 A1* | 10/2020 | Onuma | H01M 8/04089 |
| 2020/0328445 A1* | 10/2020 | Weingaertner | H01M 8/1231 |
| 2020/0350606 A1 | 11/2020 | Oto | |
| 2021/0071310 A1 | 3/2021 | Oto et al. | |
| 2021/0098796 A1* | 4/2021 | McLarty | H01M 8/0236 |
| 2021/0371990 A1 | 12/2021 | Amaya et al. | |
| 2021/0384537 A1* | 12/2021 | Roychoudhury | H01M 8/04014 |
| 2022/0344683 A1* | 10/2022 | Ancimer | H01M 8/1018 |
| 2023/0227991 A1 | 7/2023 | Saeedmanesh et al. | |

FOREIGN PATENT DOCUMENTS

| | | |
|---|---|---|
| EP | 3168330 A1 | 5/2017 |
| EP | 4086370 A2 | 11/2022 |
| EP | 4186996 A1 | 5/2023 |
| JP | 2021-059748 A | 4/2021 |
| JP | 2021134390 A | 9/2021 |
| JP | 2021191893 A | 12/2021 |

OTHER PUBLICATIONS

J.E. O'Brien et al., "A 25 kW high temperature electrolysis facility for flexible hydrogen production and system integration studies", International Journal of Hydrogen Energy, Elsevier, Amsterdam, NL, vol. 45, No. 32, May 11, 2020, pp. 15796-15804, XP086164464, ISSN: 0360-3199, DOI: 10.1016/J.IJHYDENE.2020.04.074 [retrieved on May 11, 2020].

V. Ross Highsmith et al., "Indoor Particle Concentrations Associated with Use of Tap Water in Portable Humidifiers", Environmental Science Technology, vol. 22, No. 9, Sep. 1988, pp. 1109-1112.

Non-Final Office Action Mailed Aug. 24, 2023 in U.S. Appl. No. 18/151,738.

Partial Search Report issued Jun. 13, 2023 in European Application No. 23150705.4.

International Search Report and Written Opinion for corresponding Application No. PCT/IB2023/050737 dated Apr. 28, 2023.

* cited by examiner

100

200

300

400

500

INTERNAL STEAM DELIVERY SYSTEM

FIELD OF THE INVENTION

The embodiments of the present invention generally relate to solid oxide electrolyzer (SOEC) mechanical systems and internal steam delivery therefor.

BACKGROUND OF THE INVENTION

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel conduit flow is passed through the anode side of the fuel cell. The oxidizing flow is typically air, while the fuel flow can be a hydrocarbon fuel, such as methane, natural gas, liquefied petroleum gas (LPG)/propane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A fuel cell system may include multiple hot boxes, each of which may generate electricity. A hotbox may include a fuel conduit stream that provides oxidizing fuel to one or more fuel stacks, where the fuel is oxidized during electricity generation.

SOFCs may be operated as an electrolyzer in order to produce hydrogen and oxygen, referred to as solid oxide electrolyzer cells (SOEC). SOECs are located in a hotbox. In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the steam side to the air side. Since the cathode and anode are reversed between SOFC and SOEC (i.e., SOFC cathode is SOEC anode, and SOFC anode is SOEC cathode), the SOFC cathode (SOEC anode) may be referred to as the air electrode, and the SOFC anode (SOEC cathode) may be referred to as the steam electrode.

During SOEC mode, water in the fuel stream is reduced ($H_2O+2e^- \rightarrow O^{2-}+H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.45 V.

SUMMARY OF THE INVENTION

The embodiments of the present invention are directed to various steam use and safety systems that substantially obviate one or more problems due to limitations and disadvantages of the related art.

The embodiments of the present invention the relate to an internal steam delivery system that includes a system comprising a mass flow controller to control the liquid water flowrate into a circulation heater, wherein measurement and control is performed with liquid water prior to steam conversion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Values and ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X or +/−5% X. It will be further understood that the endpoints of each of the ranges are significant both in relation to the other endpoint, and independently of the other endpoint. The values and ranges provide examples, but the embodiments of the invention are not so limited.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

In various embodiments of the present embodiments, steam can be recycled in the SOEC system.

Figure 1:
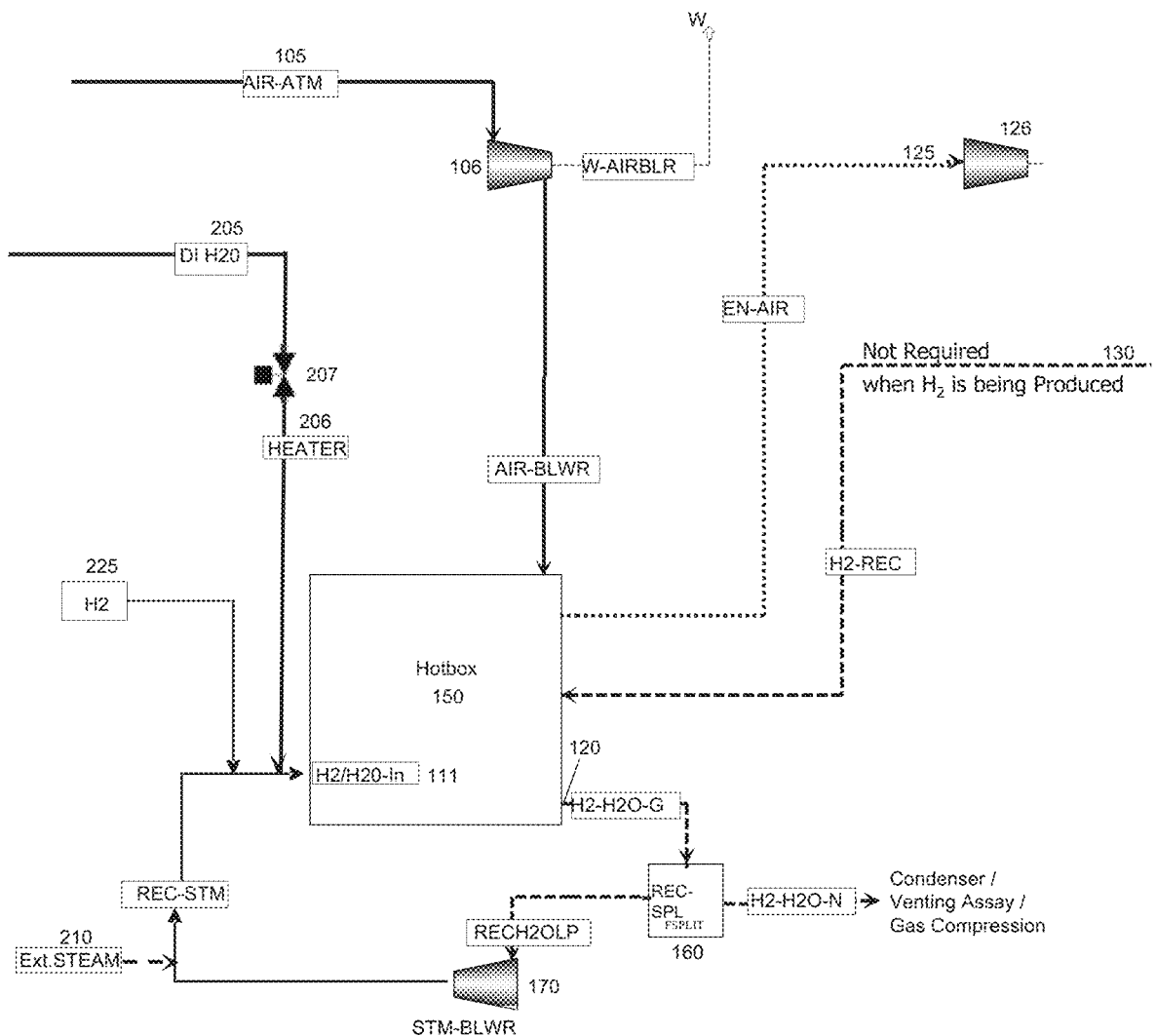
FIG. 1 is an SOEC system process flow diagram according to an example embodiment of the present invention.

FIG. 1 is an SOEC system 100 according to an example embodiment of the present invention.

As illustrated in FIG. 1, SOEC system 100 includes air conduit 105, air blower 106, recycle steam inlet 111, hotbox 150, optional hydrogen conduit 130, enriched air conduit 125, steam and hydrogen product outlet 120, splitter 160, steam recycle blower 170, external steam conduit 210, input hydrogen conduit 225, deionized water conduit 205, heater 206, and mass flow controller 207.

According to an example configuration and operation, steam input at external steam conduit 210 can have a temperature of between about 100° C. and 110° C. (e.g., 105° C.) and a pressure of about 1 psig. In the various embodiments, steam may be input to the SOEC system 100 from an external source or may be generated locally. In some embodiments, multiple steam inlets may be configured to receive external and/or local steam, respectively. Alternatively, or additionally, water, such as deionized water conduit 205, may be input to the SOEC system 100 and heated by heater 206 (e.g., vaporized).

Air input (e.g., ambient air) at air conduit 105 may be ambient temperature, perhaps between about −20° C. and +45° C., at the local atmospheric pressure. Air from air conduit 105 is received at air blower 106, and air output by air blower 106 will be a slightly higher temperature than ambient due to the heat of compression. For example, the temperature of air output by air blower 106 may be about 30° C. at 1.0 psig as compared to 20° C. ambient air temperature.

Hydrogen from optional hydrogen conduit 130 may only be required for startup and transients when hydrogen is not being otherwise produced by SOEC system 100. For example, there is no longer a need for a separate hydrogen feed stream or hydrogen recycle steam at steady state. Pressure for this hydrogen stream is a design option determined at the time of site construction, and may be between about 5 psig and 3000 psig. The temperature is likely to be near ambient, as it is likely to be coming from storage.

Air input at air conduit 105 and hydrogen input at optional hydrogen conduit 130 are input to hotbox 150. In turn, hotbox 150 outputs steam and hydrogen product $H_2$-$H_2O$-G at steam and hydrogen product outlet 120 of hotbox 150, where G stands for Gross. Hotbox output $H_2$-$H_2O$-G may have a temperature between about 100° C. and 180° C. (e.g., 130° C.), a pressure of between about 0.1 and 0.5 psig.

In addition, hotbox output $H_2$-$H_2O$-G is input to splitter 160 and is split into a steam recycle stream $RECH_2OLP$, where LP stands for low pressure, and a net product $H_2$-$H_2O$—N, where N stands for Net (e.g., output for commercial use or storage). Here, net product $H_2$-$H_2O$—N may have a temperature between about 100° C. and 180° C. (e.g., 130° C.), a pressure of between about 0.1 psig and 0.5 psig. Steam recycle stream $RECH_2OLP$ may have a temperature of between about 100° C. and 180° C. (e.g., 130° C.), a pressure of between about 0.1 psig and 0.5 psig. Hotbox 150 may further output enriched air at enriched air conduit 125 that may have a temperature of between about 120° C. and 300° C., at essentially local atmospheric pressure (e.g., less than 0.5 psig or less than 0.05 psig).

Steam recycle stream $RECH_2OLP$ is input to steam recycle blower 170. The resulting recycled steam REC-STM may have a temperature of between about 100° C. and 180° C. (e.g., 140° C.), a pressure between about 0.5 and 1.5 psig (e.g., about 1 psig), and is input into hotbox 150 at recycle steam inlet 111. Additional steam or heat can be supplied to recycle steam inlet 111 by a further steam recycle outlet (not shown), which captures air exhaust heat (e.g., ~280° C.) of hotbox 150. In some embodiments, there may be no recycled hydrogen feed included with the recycled steam.

As can be understood from FIG. 1, incoming steam temperature at external steam conduit 210 (e.g., 105° C.) may be low compared with a SOEC configuration with internal steam generation. A plurality of recycle loops can be configured to SOEC systems using both internal steam generation from a recycle steam outlet (not shown) and external steam generation from steam conduit 210. In other words, recycle steam inlet 111 is configured to receive steam from external steam conduit 210 and/or recycle steam.

SOEC system 100 utilizes external steam conduit 210 as well as heated deionized water conduit 205. Deionized water of deionized water conduit 205 can be heated by heater 206. Mass flow controller 207 is located upstream from one or more heaters 206 and is configured to control the liquid water flowrate into the one or more heaters. The mass flow of steam exiting the one or more heaters 206 is equal to the mass flow of liquid water entering the one or more heaters 206. Hydrogen is supplied by input hydrogen conduit 225. Each of external steam 210, input hydrogen conduit 225, and heated deionized water conduit 205 are supplied on the recycle loop downstream from steam recycle blower 170, as shown in FIG. 1. The resulting hydrogen and steam product is input at recycle steam inlet 111.

Mass flow controller 207 may be achieved by one or more devices such as a proportional (or flow) valve and a water flow meter as separate devices or an integrated device.

Figure 2:
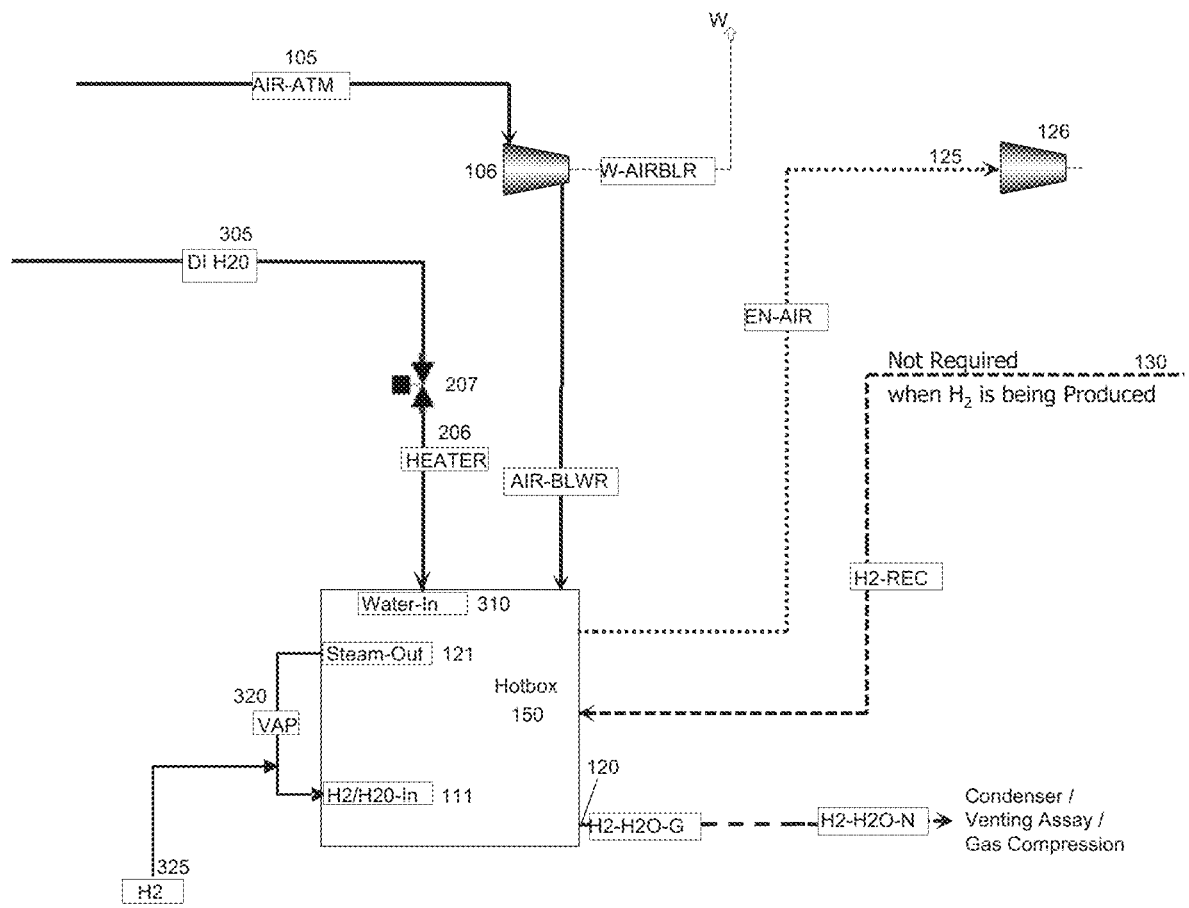
FIG. 2 is an SOEC system process flow diagram according to another example embodiment of the present invention.

FIG. 2 is an SOEC system 200 process flow diagram according to another example embodiment of the present invention. The components of SOEC system 200 are similar to the components of SOEC system 100, as described in connection with FIG. 1, and the differences between systems 200 and 100 will now be described.

In the example embodiment, SOEC system 200 does not require use of input steam conduit as well as the recycle loop by not utilizing splitter 160 and steam recycle blower 170, and their downstream. Instead, SOEC system 200 generates internal steam by heating deionized water of deionized water conduit 305 that is received at water inlet 310. Steam outlet by recycle steam outlet 121 is further heated by vaporizer 320 and mixed with hydrogen of input hydrogen conduit 325. The resulting hydrogen and steam product is input at recycle steam inlet 111, as shown in FIG. 2.

Figure 3:
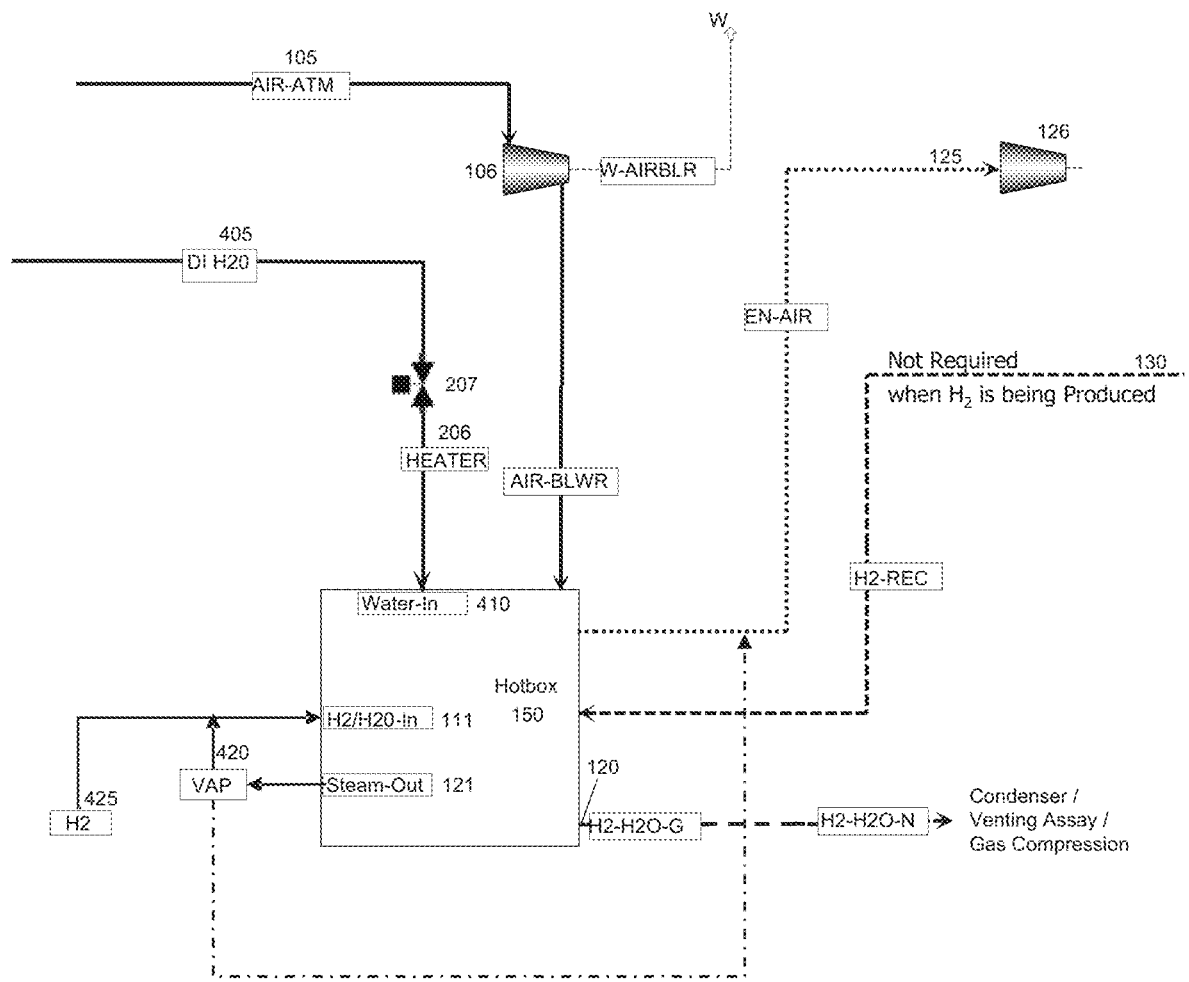
FIG. 3 is an SOEC system process flow diagram according to another example embodiment of the present invention.

FIG. 3 is an SOEC system 300 process flow diagram according to another example embodiment of the present invention. The components of SOEC system 300 are similar to the components of SOEC system 100, as described in connection with FIG. 1, and the differences between systems 300 and 100 will now be described.

In the example embodiment, SOEC system 300 does not require use of an input steam conduit as well as the recycle loop by not utilizing splitter 160 and steam recycle blower 170, and their downstream. Instead, SOEC system 300 generates internal steam by heating deionized water of deionized water conduit 405 that is received at water inlet 410. Steam outlet by recycle steam outlet 121 is further heated by vaporizer 420 and mixed with hydrogen of input hydrogen conduit 425. In some configurations, a demister (not shown) is included at the output of vaporizer 420. In some configurations, excess steam can be vented to enriched air conduit 125. The resulting hydrogen and steam product is input at recycle steam inlet 111, as shown in FIG. 3.

Figure 4:
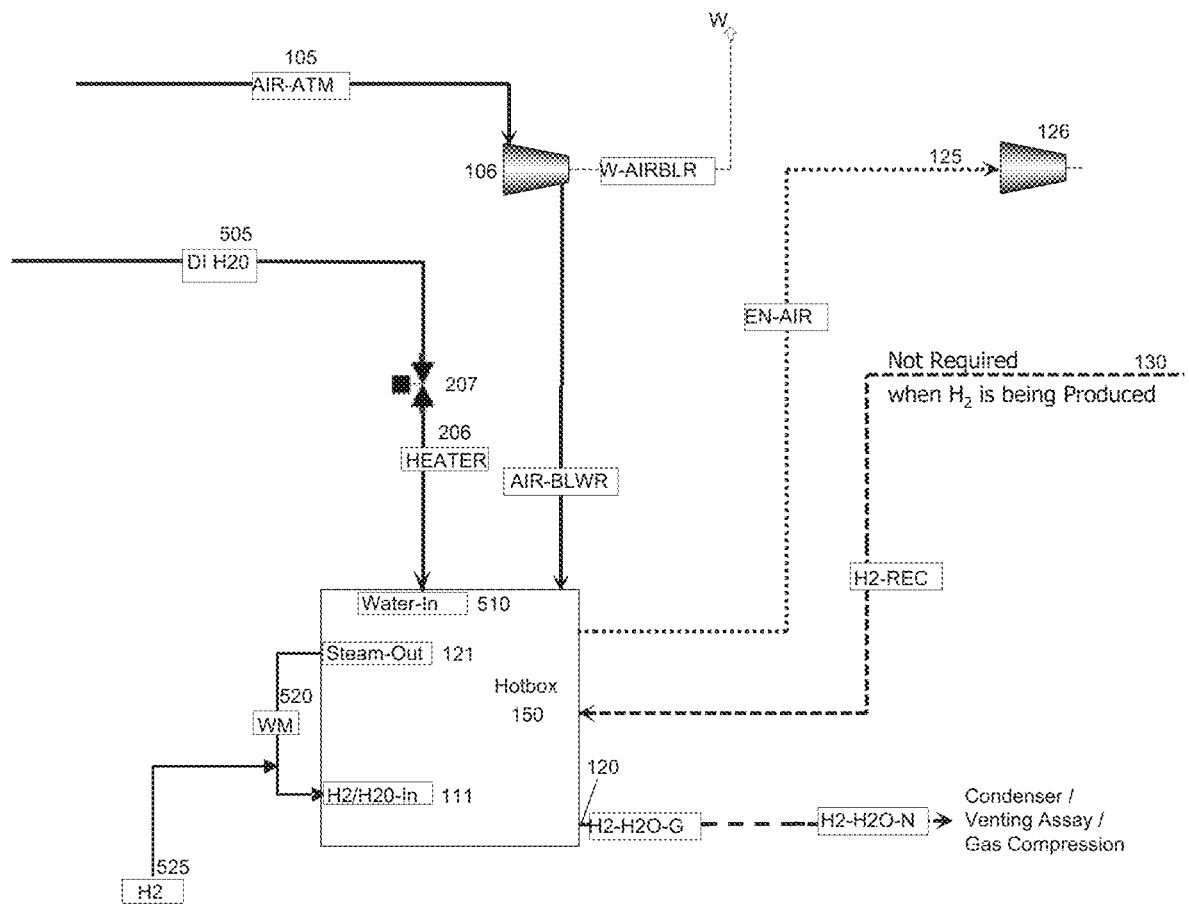
FIG. 4 is an SOEC system process flow diagram according to another example embodiment of the present invention.

FIG. 4 is an SOEC system 400 process flow diagram according to yet another example embodiment of the present invention. The components of SOEC system 400 are similar to the components of SOEC system 100, as described in connection with FIG. 1, and the differences between systems 400 and 100 will now be described.

In the example embodiment, SOEC system 400 does not require use of an input steam conduit as well as the recycle loop by not utilizing splitter 160 and steam recycle blower 170, and their downstream. Instead, SOEC system 400 generates internal steam by heating deionized water of deionized water conduit 505 that is received at water inlet 510. Steam outlet by recycle steam outlet 121 is regulated by water monitor system 520 (e.g., level transducer float type). Steam released and optionally heated and demisted by water monitoring system 520 is mixed with hydrogen of input hydrogen conduit 525. The resulting hydrogen and steam product is input at recycle steam inlet 111, as shown in FIG. 4.

In the various embodiments, such as systems 100, 200, 300, 400, the SOECs utilize steam as a media input for the electrochemical process. When steam is not readily available, steam is generated from site-supplied water, such as deionized water. Use of water to generate steam has advantages. For example, controlling the mass flow of liquid water is simpler and more cost effective than controlling the mass flow of its high temperature gaseous form as steam.

For example, the steam flowrate into the electrolyzer is controlled by varying the liquid water mass flow into one or more heaters, such as a circulation heater. In the various configurations, heater power, temperatures, and/or pressure is balanced to ensure that the liquid water is changing state at a calculated rate (e.g., constant rate) and that the mass flow of steam exiting the one or more heaters is equal to the mass flow of liquid water entering the one or more heaters.

In known systems, adjustable control of steam flow requires costly and large components to accurately measure and control the steam flow. Scaling deposits in the steam can contaminate and cause premature failure of the steam measurement and control devices. Traditional steam boilers require water level, temperature, and pressure control. Heating elements in direct contact with the liquid water can quickly overheat and fail if the liquid level is not properly maintained. Boilers with heating elements in direct contact with the liquid water fail over time due to scaling build up on the heating elements.

In the various embodiments, flow control systems, devices, and methods are provided. The system uses mass flow controller (e.g., 207) to control the liquid water flowrate into one or more heaters (e.g., a circulation heater). As measurement and control is done with liquid water prior to steam conversion, there are no costly measurement or control devices downstream that may be contaminated with scaling deposits. Energy into the heating elements of the heaters and outlet temperature and pressure exiting the circulation heater are monitored and controlled to balance the system resulting in equal mass entering and exiting the one or more heaters.

Preferably, the embodiments use a circulation heater instead of a traditional water boiler. Circulation heaters make use of an intermediary medium such as aluminum or brass to dissipate and transfer heat to the process media embedded in an isolated flow path. This enables the embodiments to run "dry" with no water present and to be preheated to operating temperature without generating steam. This type of heating prevents heater element burnout that occurs in traditional boilers that are operated without water initially present. Because the water/steam is not in direct contact with the heating elements, they are not at risk of failure from scaling deposit build up.

Figure 5:
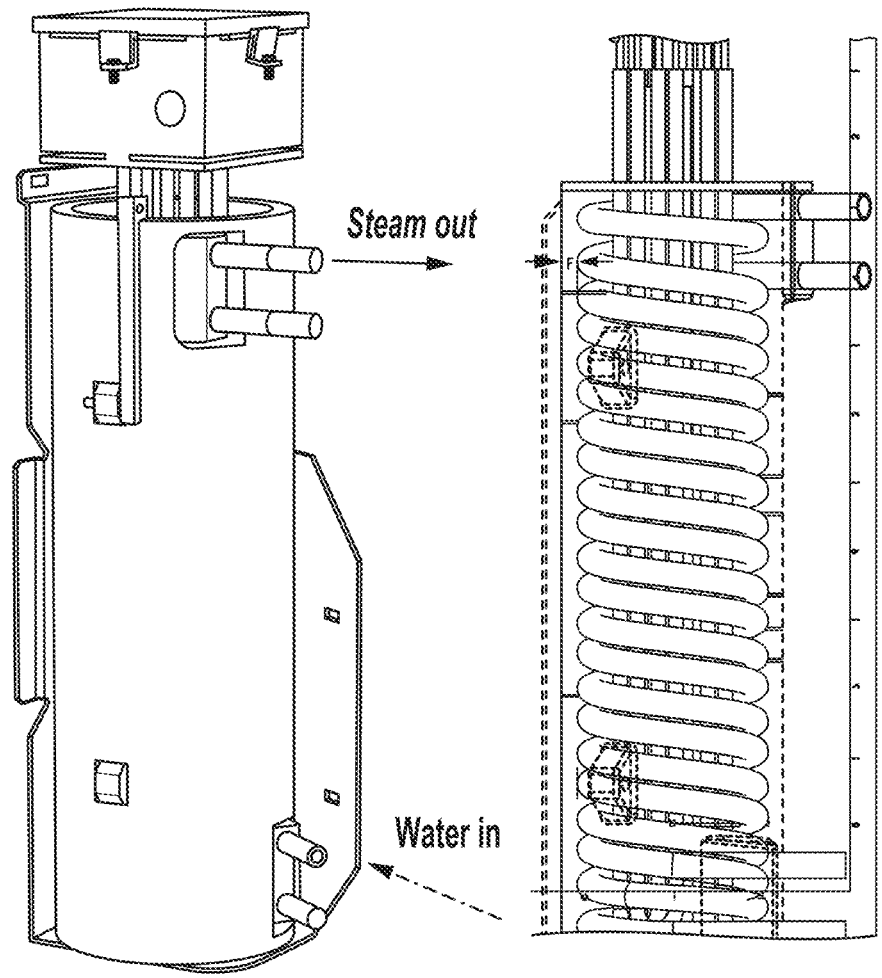
FIG. 5 illustrates a circulation heater according to an example embodiment of the invention.

FIG. 5 illustrates a circulation heater 500 according to an example embodiment of the invention. Additional circulation heater or other heater configurations are feasible, such as single heating tube as well as multi-heating tubes configured in series and/or in parallel.

Controlling the mass flow of liquid water is simpler and more cost effective than controlling it in high temperature gaseous form as steam. Accordingly, the embodiments reduce complexity and cost and eliminate known failure risks associated with traditional boiler designs.

In each of the various embodiments described herein, one or more detectors can be used to detect a safety event. For example, one or more pressure detectors and one or more thermal detectors can be used. One or more pressure detectors can be placed along input hydrogen conduits (e.g., 225, 325, 425, 525) to detect under pressure (e.g., under 5 PSI) and excess pressure. If a pressure detector is tripped, the system (i.e., hotbox 150) is shutdown. Additionally, one or more thermal detectors can be placed within the cabinet of the hotbox to detect excess heat (e.g., over 230° C.). Cabinet ventilation is provided and maintained by enriched air blower 126, for example. If a thermal detector is tripped, the system (i.e., hotbox 150) is shutdown.

The SOEC system (e.g., 100, 200, 300, 400) ceases receiving hydrogen when the SOEC system is operating at steady state or upon detection of a safety event. Additionally, the stack of electrolyzer cells in hotbox 150 can be configured to receive hydrogen when the SOEC system is in startup, shutdown, or when the SOEC system is not producing hydrogen or not producing enough hydrogen.

To operate an SOEC there are mechanical systems and components required to provide water, air, and start-up fuel. Safety systems also protect the system against fire and other damage to the surroundings and people in proximity. Operating the SOEC with required safety systems prevents harm and hazards due to leaking hydrogen and/or other failures. Other SOEC systems may include hazardous location devices, or double containment of fuel components.

It will be apparent to those skilled in the art that various modifications and variations can be made in the internal steam delivery system of the present invention without departing from the spirit or scope of the invention. Thus, it is intended that the present invention cover the modifications and variations of this invention provided they come within the scope of the appended claims and their equivalents.

What is claimed is:

1. A solid oxide electrolyzer cell (SOEC) system comprising:
a hotbox housing a stack of electrolyzer cells configured to convert steam provided to the stack via an inlet of the hotbox into a product comprising hydrogen ($H_2$);
a circulation heater disposed outside of the hotbox and configured to heat water to generate the steam that is provided to the hotbox;
at least one conduit configured to provide the water to the circulation heater and the steam to the hotbox; and
a mass flow controller comprising a proportional valve and a water flow meter configured to control a flowrate of the water through the at least one conduit to the circulation heater, such that a mass flow of the steam exiting the circulation heater is equal to a mass flow of the water entering the circulation heater.

2. The SOEC system of claim 1, wherein a hydrogen and steam exhaust stream is recycled back to the stack.

3. The SOEC system of claim 1, further comprising:
a splitter configured to receive the product from an outlet of the hotbox and to output a recycled a portion of the product; and
a recycle blower configured to receive the recycled portion of the product from the splitter and to provide the recycled portion of the product to the inlet of the hotbox.

4. The SOEC system of claim 1, wherein the stack of electrolyzer cells is configured to cease receiving external hydrogen when the SOEC system is operating at steady state.

5. The SOEC system of claim 4, wherein the stack of electrolyzer cells is configured to receive the external hydrogen when the SOEC system is in startup, shutdown, or when the SOEC system is not producing hydrogen.

6. The SOEC system of claim 4, wherein the stack of electrolyzer cells is configured to cease receiving the external hydrogen when the SOEC system detects a safety event.

7. The SOEC system of claim 6, wherein the safety event is detected by a pressure detector or a thermal detector.

8. The SOEC system of claim 1, further comprising:
a condenser configured to remove water from the product; and
a compressor configured to compress the product output from the condenser.

9. The SOEC system of claim 1, wherein the circulation heater comprises:
heating tubes that are fluidly connected to the at least one conduit; and
a heating element surround by and configured to heat the heating tubes,
wherein the heating tubes are fluidly connected to the at least one conduit in parallel or in series.

* * * * *